United States Patent
Chen et al.

(10) Patent No.: US 10,818,982 B2
(45) Date of Patent: Oct. 27, 2020

(54) QUICK CHARGE BATTERY

(71) Applicant: APO INTERNATIONAL CO., LTD., Taipei (TW)

(72) Inventors: Hsiang-Ming Chen, Taipei (TW); Ting-Ping Lin, Taipei (TW); Ker-Wen Teng, Taipei (TW); Kuo-Pin Wen, Taipei (TW)

(73) Assignee: APO INTERNATIONAL CO., LTD., Taipei (TW)

( * ) Notice: Subject to any disclaimer, the term of this patent is extended or adjusted under 35 U.S.C. 154(b) by 47 days.

(21) Appl. No.: 15/908,633

(22) Filed: Feb. 28, 2018

(65) Prior Publication Data

US 2019/0207273 A1    Jul. 4, 2019

(30) Foreign Application Priority Data

Dec. 28, 2017    (TW) .............................. 106219382 U

(51) Int. Cl.
| | |
|---|---|
| *H01M 2/04* | (2006.01) |
| *H01M 10/46* | (2006.01) |
| *H01M 10/42* | (2006.01) |
| *H01M 10/44* | (2006.01) |
| *H01M 2/02* | (2006.01) |
| *H02J 7/00* | (2006.01) |
| *H01M 2/10* | (2006.01) |

(52) U.S. Cl.
CPC ........... *H01M 10/46* (2013.01); *H01M 2/022* (2013.01); *H01M 2/028* (2013.01); *H01M 2/0404* (2013.01); *H01M 10/425* (2013.01); *H01M 10/4257* (2013.01); *H01M 10/44* (2013.01); *H02J 7/0029* (2013.01); *H02J 7/0042* (2013.01); *H01M 2/105* (2013.01); *H02J 7/00302* (2020.01)

(58) Field of Classification Search
USPC ......................................................... 320/107
See application file for complete search history.

(56) References Cited

U.S. PATENT DOCUMENTS

| | | | |
|---|---|---|---|
| 2007/0253194 A1* | 11/2007 | Sharrah ................... | F21L 4/085 362/183 |
| 2013/0049675 A1* | 2/2013 | Minami ................... | G06F 1/266 320/103 |

(Continued)

*Primary Examiner* — Nathaniel R Pelton
*Assistant Examiner* — Mohammed J Sharief
(74) *Attorney, Agent, or Firm* — Maschoff Brennan

(57) ABSTRACT

The disclosure is related to a quick charge battery which includes a battery cell, a cap assembly, a quick charge assembly and an insulating film. The cap assembly protrudes from the battery cell. The cap assembly includes a main body and an electrically conductive member. The electrically conductive member is located on a side of the main body away from the battery cell. The quick charge assembly is located in the main body and is located between the battery cell and the electrically conductive member. The quick charge assembly includes a circuit board and a quick charge connector. The quick charge connector is electrically connected to the battery cell. The electrically conductive member is electrically connected to the battery cell. The insulating film is sleeved on the battery cell and the cap assembly. The quick charge connector is exposed from the main body and the insulating film.

10 Claims, 9 Drawing Sheets

(56) References Cited

U.S. PATENT DOCUMENTS

| | | | | |
|---|---|---|---|---|
| 2013/0265747 A1* | 10/2013 | Liu | ........................... | F21L 4/08 |
| | | | | 362/157 |
| 2014/0049223 A1* | 2/2014 | Berger | ................ | H01M 10/425 |
| | | | | 320/135 |
| 2014/0090916 A1* | 4/2014 | Lovley, II | ................. | B62L 1/04 |
| | | | | 180/220 |
| 2016/0094069 A1* | 3/2016 | Park | ......................... | H02J 7/00 |
| | | | | 362/183 |
| 2016/0197337 A1* | 7/2016 | Yau | .................... | H02J 7/00036 |
| | | | | 429/7 |
| 2016/0259377 A1* | 9/2016 | Hoellwarth | ....... | B29C 45/14639 |
| 2018/0166895 A1* | 6/2018 | Oh | ......................... | H02J 7/0042 |

* cited by examiner

QUICK CHARGE BATTERY

CROSS-REFERENCE TO RELATED APPLICATIONS

This non-provisional application claims priority under 35 U.S.C. § 119(a) on Patent Application No(s). 106219382 filed in Taiwan, R.O.C. on Dec. 28, 2017, the entire contents of which are hereby incorporated by reference.

TECHNICAL FIELD

The disclosure relates to a battery, more particularly to a quick charge battery.

BACKGROUND

A rechargeable battery (secondary battery), such as a lithium battery, a nickel-iron battery, a lead-acid battery, a nickel-cadmium battery and a nickel-metal hydride battery, is an electrical energy source which can be charged, discharged into a load, and recharged many times. In compared to a disposable or primary battery, which is designed to be used once and discarded and not able to be recharged with electricity. The rechargeable battery can store energy through a reversible chemical reaction, which allows charge to be stored again after the battery has been drained.

SUMMARY OF THE INVENTION

One embodiment of the disclosure provides a quick charge battery. The quick charge battery includes a battery cell, a cap assembly, a quick charge assembly and an insulating film. The battery cell has a positive terminal and a negative terminal. The cap assembly is located on the positive terminal or the negative terminal and protrudes from the battery cell in an axial direction of the battery cell. The cap assembly includes a main body and an electrically conductive member. The electrically conductive member is located on a side of the main body away from the battery cell. The quick charge assembly is located in the main body of the cap assembly and is located between the battery cell and the electrically conductive member. The quick charge assembly includes a circuit board and a quick charge connector. The quick charge connector is electrically connected to the battery cell through the circuit board and configured to transmit large current. The electrically conductive member is electrically connected to the battery cell through the circuit board. The insulating film extends in the axial direction of the battery cell and is sleeved on the battery cell and the cap assembly. The quick charge connector is exposed from the main body and the insulating film.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
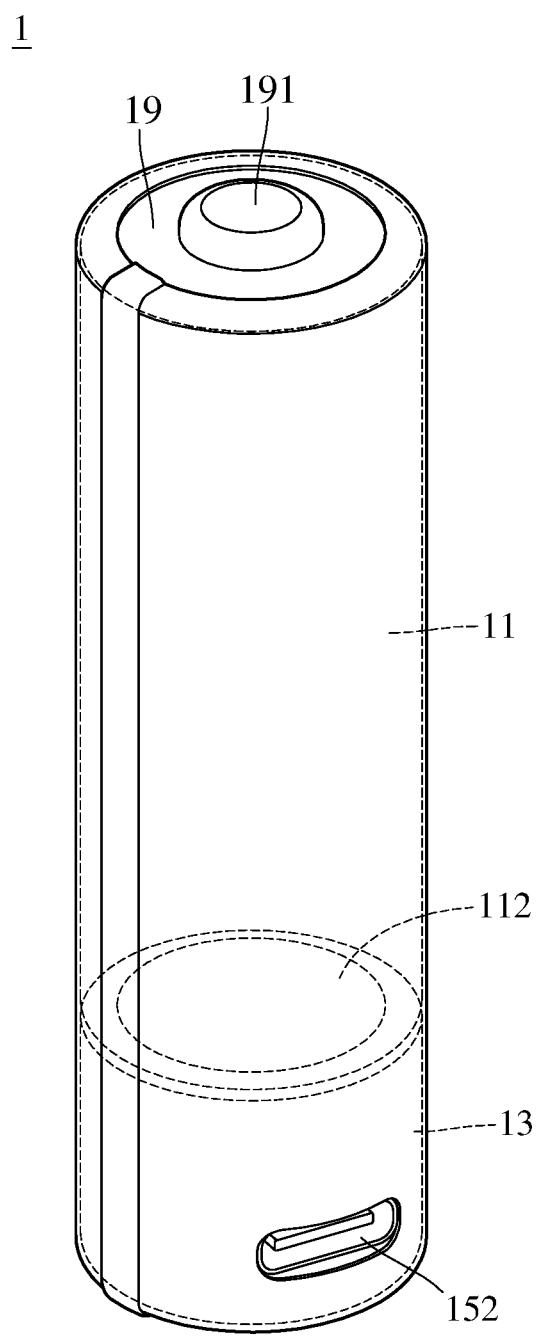
FIG. 1 is a perspective view of a quick charge battery according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
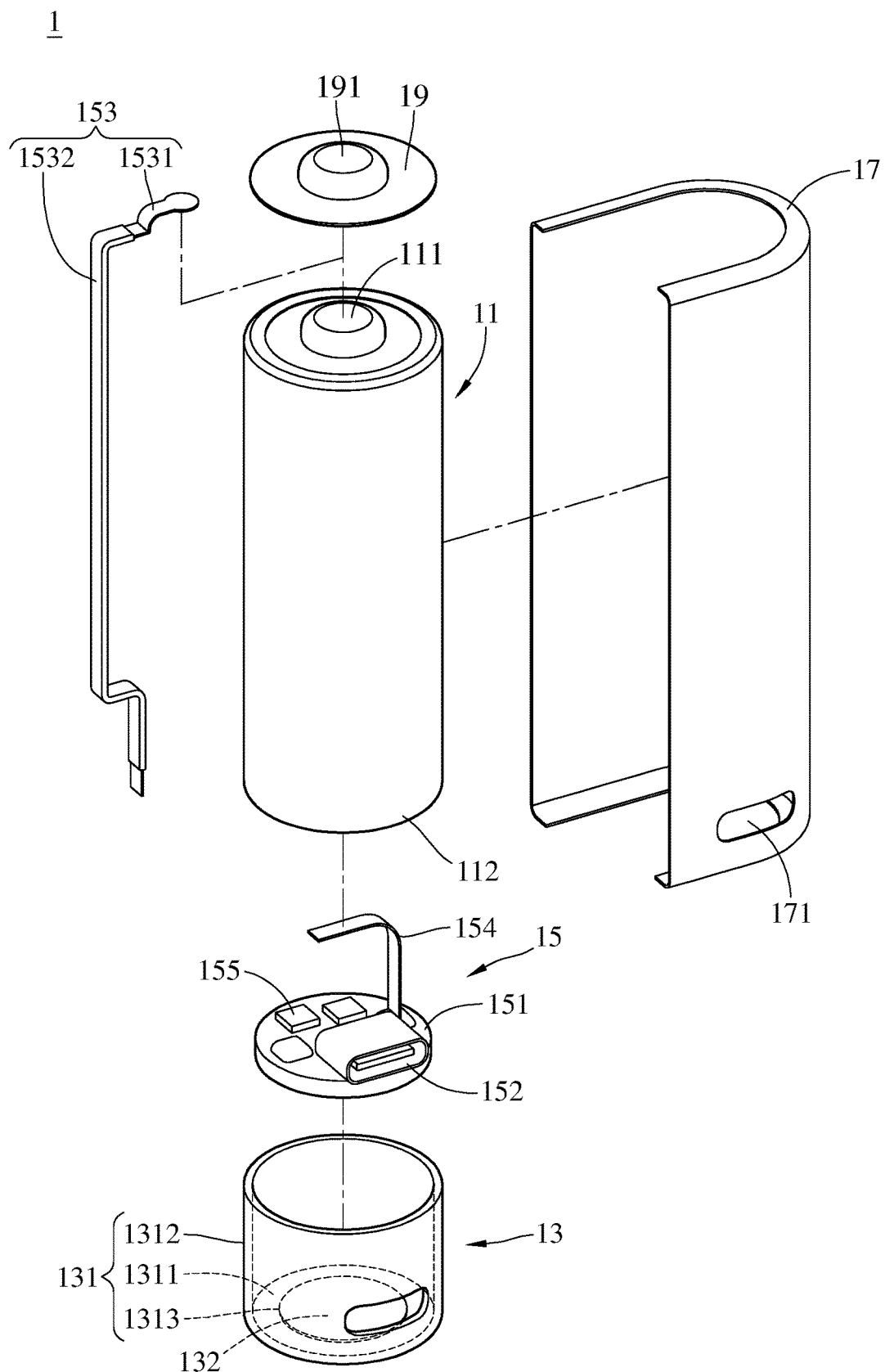
FIG. 2 is an exploded view of the quick charge battery in FIG. 1.
Figure 3:
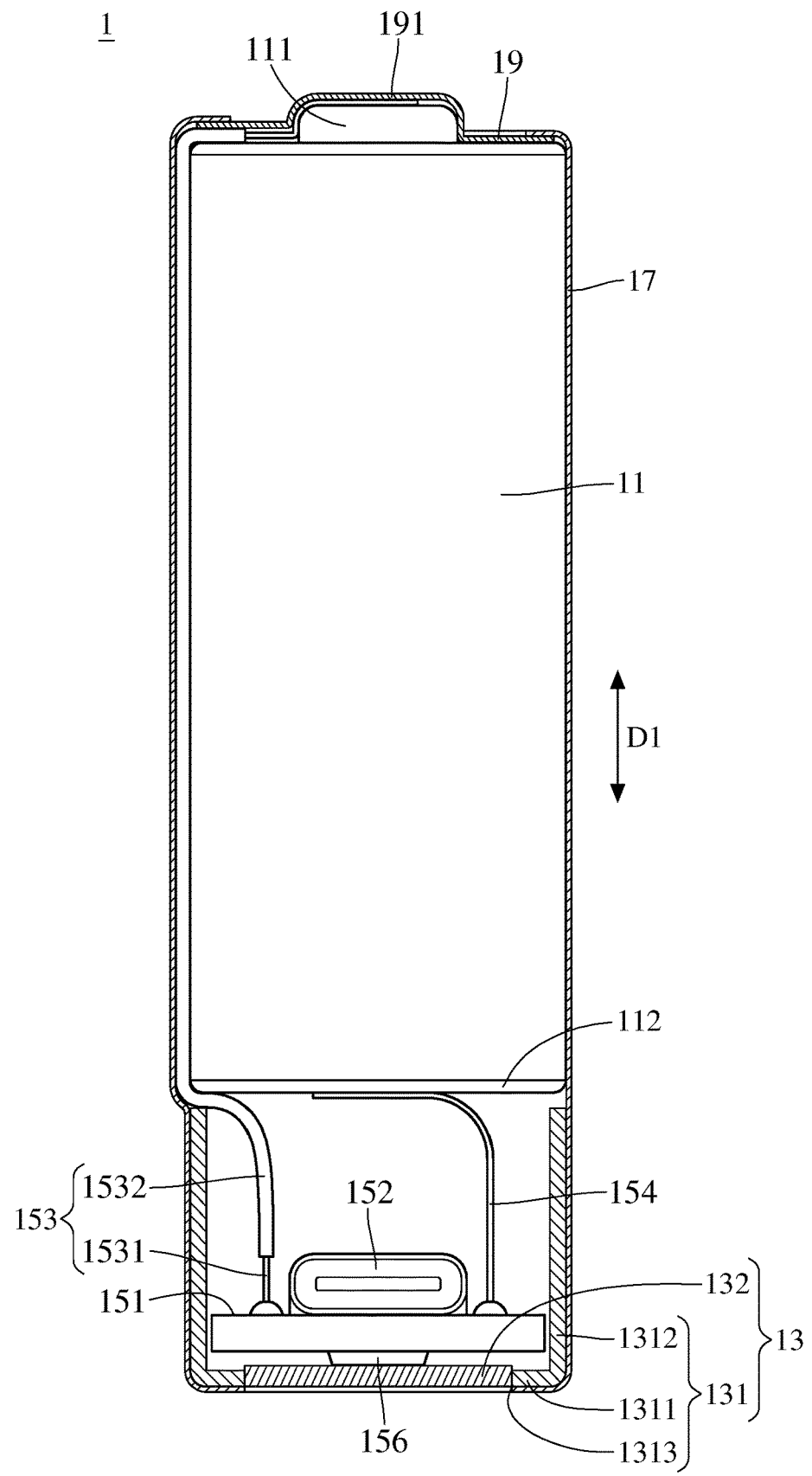
FIG. 3 is a cross-sectional view of the quick charge battery in FIG. 1.

Please refer to FIG. 1 to FIG. 3, FIG. 1 is a perspective view of a quick charge battery according to one embodiment of the disclosure. FIG. 2 is an exploded view of the quick charge battery in FIG. 1. FIG. 3 is a cross-sectional view of the quick charge battery in FIG. 1. As shown in FIG. 1, this embodiment provides a quick charge battery 1. The quick charge battery 1 includes a battery cell 11, a cap assembly 13, a quick charge assembly 15 and an insulating film 17. The battery cell 11 is a rechargeable or secondary battery. The battery cell 11 has a positive terminal 111 and a negative terminal 112. The positive terminal 111 and the negative terminal 112 are located on two opposite sides of the battery cell 11. The positive terminal 111 has a cap part (not numbered) which has a shape distinguishable from that of the negative terminal 112, but the present disclosure is not limited thereto. It is noted that the battery cell 11 can be taken as a regular rechargeable battery already existing in the market, or a rechargeable battery without any insulating film. As shown in figures, the battery cell 11 is, for example, a 18500 battery. At 18 mm wide and 50 mm tall, the 18500 battery is in a cylinder shape. However, the present disclosure is not limited to the type of the battery cell 11. In some other embodiments, the battery cell 11 may be a 18470, 14270, or CR2(15260) battery.

The cap assembly 13 is located on the positive terminal 111 or the negative terminal 112, and protrudes from the battery cell 11 in an axial direction D1 of the battery cell 11. As shown in FIG. 1 to FIG. 3, the cap assembly 13 is located on the negative terminal 112 of the battery cell 11. The cap assembly 13 has a main body 131 and an electrically conductive member 132. The main body 131 has a first bottom part 1311 and a sleeve part 1312. The first bottom part 1311 is connected to a side of the sleeve part 1312 away from the battery cell 11, and has an opening 1313. The opening 1313 is connected to an internal space surrounded by the sleeve part 1312.

The electrically conductive member 132 is disposed at the opening 1313. Thus, the electrically conductive member 132 is exposed from the opening 1313. More specifically, in this embodiment, the electrically conductive member 132 is disposed in and aligned with the opening 1313, so it can be exposed from the opening 1313. However, the electrically conductive member 132 is not restricted to be disposed at the opening 1313. For example, in some other embodiments, the electrically conductive member 132 may be in the main body 131 and be located between the first bottom part 1311 and the battery cell 11, and it still can be exposed from the opening 1313.

The cap assembly 13 protrudes from the negative terminal 112 in the axial direction D1 so as to lengthen the overall length. In such as case, the length of the quick charge battery 1 is the length of the battery cell 11 plus the thickness of the cap assembly 13. In one embodiment, the thickness of the cap assembly 13 is about 15 mm, and the battery cell 11 is a 18500 battery, and then the total length of the quick charge battery 1 will be about 65 mm, such that the quick charge battery 1 may be as tall as a 18650 battery, and they may seem similar in appearance, allowing it to be taken as a 18650 battery.

However, the present disclosure is not limited to the type of the battery cell 11. For example, in some other embodiments, the battery cell 11 may be a 18470 battery, when it is assembled with the cap assembly 13, the quick charge battery 1 would be as tall as a 18600 battery, allowing the quick charge battery 1 to be taken as a 18600 battery. Taking more examples, the battery cell 11 may be a 18600, 21650, 20600, 16280, 16240 or 15200 battery, which can respectively make the quick charge batteries 1 to be taken as a 18650, 21700, 20650, CR123a(16340), CR123a(16340) or CR2(15260) battery. In addition, in the aforementioned examples, the widths of the quick charge batteries 1 after assembling with cap assemblies 13 are equal to the width of the battery cell 11, but the present disclosure is not limited thereto. In some other embodiments, the widths of the cap assemblies 13 may be larger than the widths of the battery cells 11, so that the widths of the overall quick charge batteries 1 after assembling with cap assemblies 13 is larger than the widths of the battery cells 11.

The quick charge assembly 15 is located in the main body 131 of the cap assembly 13, and located between the battery cell 11 and the electrically conductive member 132. In one embodiment, the quick charge assembly 15 includes a circuit board 151, a quick charge connector 152, a first electrically conductive element 153, a second electrically conductive element 154 and a control circuit 155. The quick charge connector 152, the first electrically conductive element 153, the second electrically conductive element 154 and the control circuit 155 are all disposed on and electrically connected to the circuit board 151 so that they are all connected to one another. The first electrically conductive element 153 is configured to be electrically connected to the positive terminal 111 of the battery cell 11, and the second electrically conductive element 154 is configured to be electrically connected to the negative terminal 112 of the battery cell 11. Thus, the control circuit 155 is able to be electrically connected to the positive terminal 111 and negative terminal 112 of the battery cell 11 through the first electrically conductive element 153 and the second electrically conductive element 154. However, the present disclosure is not limited to how to electrically connect the circuit board 151 to the battery cell 11.

In one embodiment, the cap assembly 13 and the battery cell 11 may be fixed to each other via adhesive and then be sleeved by the insulating film 17. As shown in the figures, the sleeve part 1312 of the cap assembly 13 has an opening 134 which can expose the quick charge connector 152, and the insulating film 17 also has an opening 171 which can align with the opening of the cap assembly 13 after the installation of the insulating film 17.

These two openings can leave the quick charge connector 152 exposed. In addition, the insulating film 17 extends in the axial direction D1 of the battery cell 11, when it is and is sleeved on the exterior of the battery cell 11 and the cap assembly 13, the positive terminal 111 of the battery cell 11 and the electrically conductive member 132 of the cap assembly 13 are exposed from the insulating film 17.

With the help of the adhesive, the insulating film 17 can be easily sleeved on the cap assembly 13 and the battery cell 11, and the cap assembly 13 is prevented from moved with respect to the battery cell 11 during the installation of the insulating film 17, thereby increasing the structural strength of the quick charge battery 1. However, the cap assembly 13 and the battery cell 11 may be fixed to each other via other manners, the present disclosure is not limited thereto. In some other embodiments, the cap assembly 13 and the battery cell 11 can be directly sleeved by the insulating film 17 without being firmly fixed to each other.

In one embodiment, the main body 131 is made of, for example, plastic so as to prevent a short circuit between the battery cell 11 and the main body 131. The electrically conductive member 132 is made of, for example, electrically conductive material, so it can be taken as a terminal of the quick charge battery 1. As shown in the figures, the circuit board 151 is stacked on the first bottom part 1311 of the main body 131 with a contact 156 therebetween. The contact 156 is electrically connected to the circuit board 151 and the electrically conductive member 132, such that the electrically conductive member 132 is electrically connected to the battery cell 11 through the circuit board 151. However, the contact 156 is optional, the electrically conductive member 132 and the battery cell 11 may be electrically connected to each other via other manners.

Figure 4:
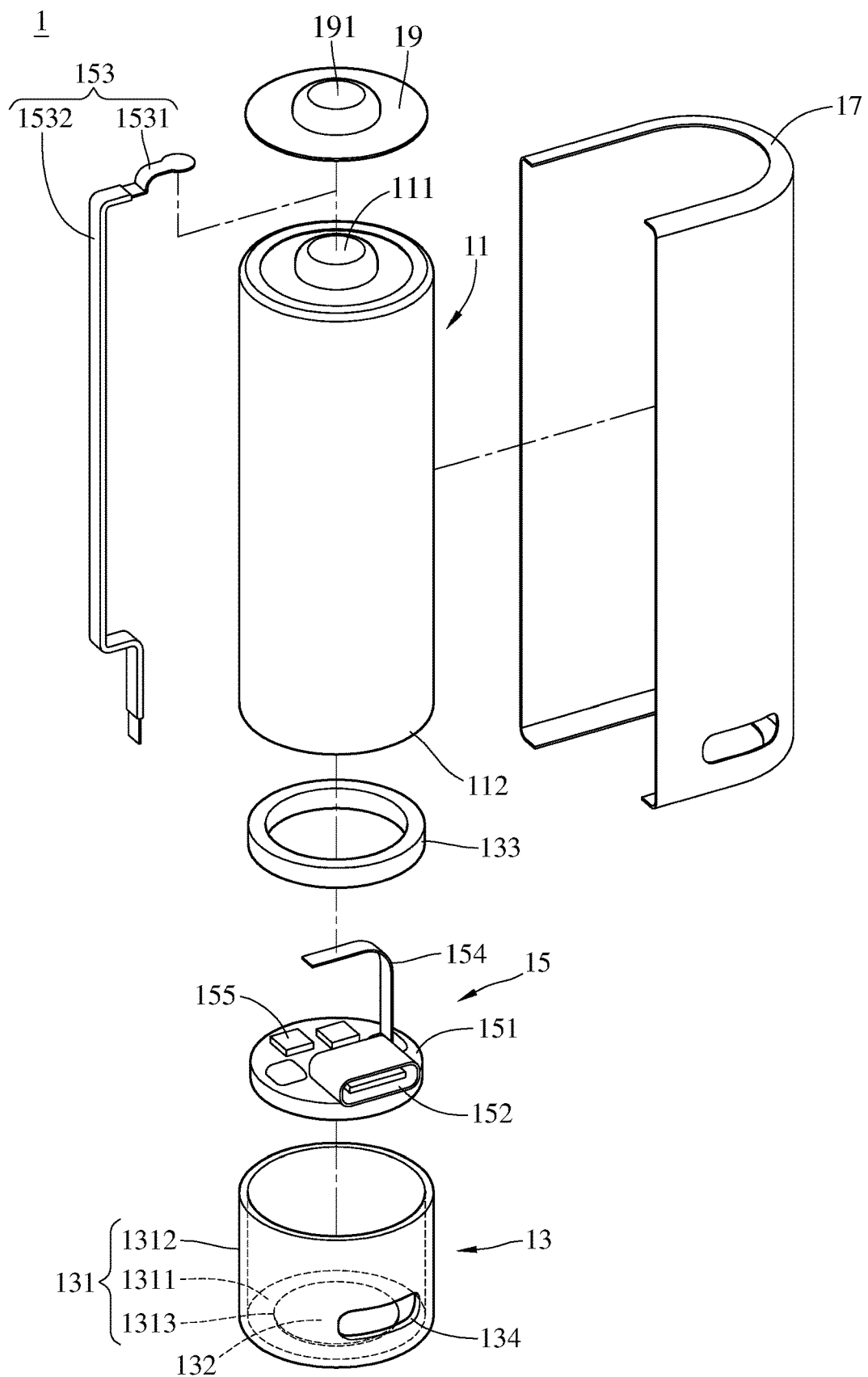
FIG. 4 is an exploded view of a quick charge battery according to another embodiment of the disclosure.

Then, please refer to FIG. 4. FIG. 4 is an exploded view of a quick charge battery according to another embodiment of the disclosure. The cap assembly 13 may further include an electrical insulation gasket 133 which is used to prevent a short circuit between the quick charge assembly 15 and the battery cell 11. As shown in FIG. 4, the electrical insulation gasket 133 is located in the main body 131 and is located between the battery cell 11 and the circuit board 151, such that the electrical insulation gasket 133 is able to insulate the battery cell 11 from the quick charge assembly 15. However, the electrical insulation gasket 133 is optional, the present disclosure is not limited thereto.

In the previous embodiments as shown in FIG. 1 to FIG. 4, when the cap assembly 13 is disposed at the negative terminal 112 of the battery cell 11, the first electrically conductive element 153 of the quick charge assembly 15 extends along a side wall of the battery cell 11 from the cap assembly 13 and is electrically connected to the positive terminal 111 of the battery cell 11. The first electrically conductive element 153 is fixed to the positive terminal 111 of the battery cell 11 by, for example, welding. In addition, the quick charge battery 1 may further include a cover 19 for covering the positive terminal 111 of the battery cell 11 and the welding spot, and protecting the welding spot between the first electrically conductive element 153 and the positive terminal 111. The cover 19 has a cap part 191 which can be taken as a positive terminal of the quick charge battery 1, but the present disclosure is not limited thereto. Furthermore, the first electrically conductive element 153 further includes an electrically conductive portion 1531 and an electrical insulation portion 1532. The electrical insulation portion 1532 is located between the battery cell 11 and the electrically conductive portion 1531. The electrical insulation portion 1532 is configured to insulate the battery cell 11 from the electrically conductive portion 1531. In some other embodiments, there may be no any electrical insulation portion 1532, and an insulation element may be disposed on the outside of the battery cell 11 to insulate the battery cell 11 and the electrically conductive portion 1531, or both of the electrical insulation portion 1532 and the insulation element insulate the battery cell 11 and the electrically conductive portion 1531 at the same time.

Figure 5:
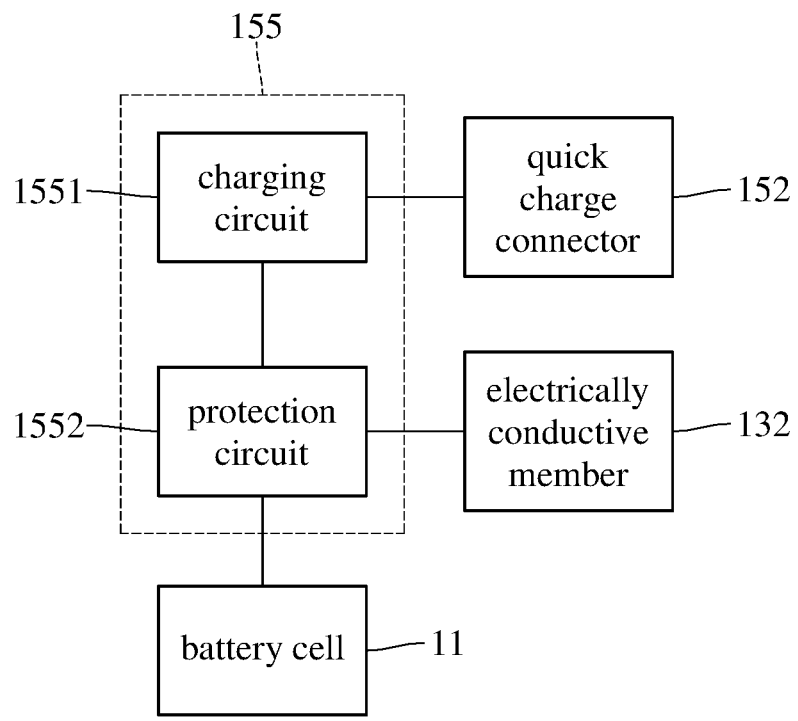
FIG. 5 is a block diagram of a control circuit of a quick charge battery according to still another embodiment of the disclosure.
Figure 6:
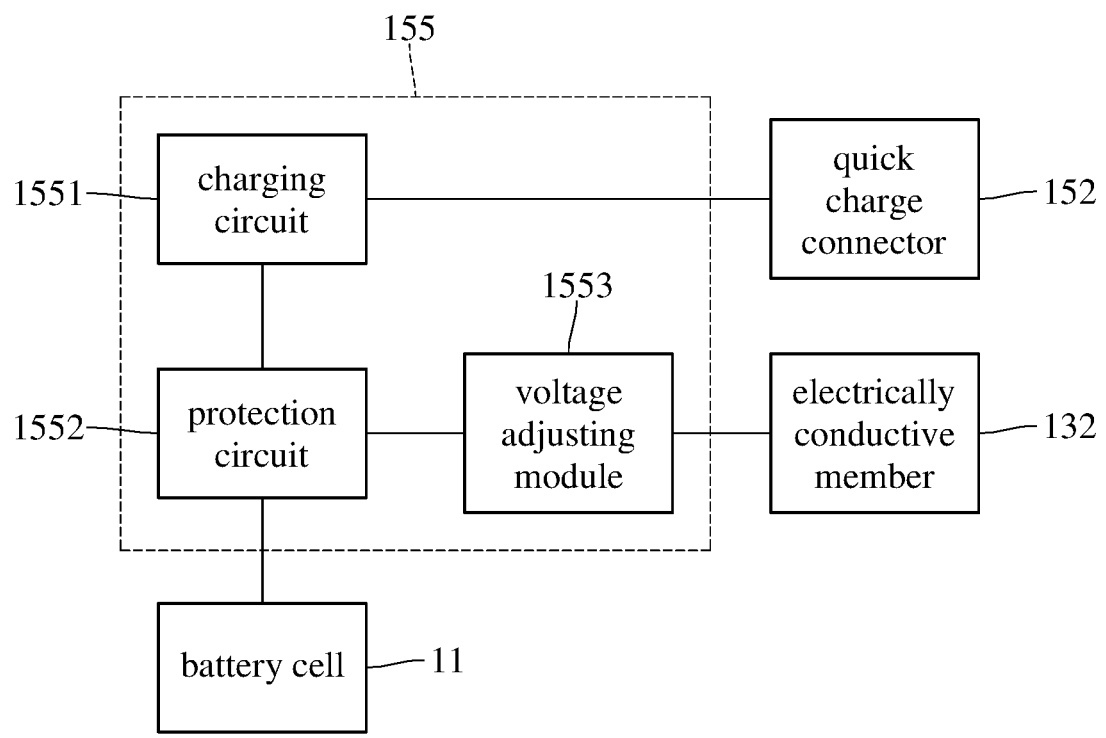
FIG. 6 is a block diagram of a control circuit of a quick charge battery according to yet still another embodiment of the disclosure.

Then, the detail description of the control circuit 155 is descripted in the following paragraphs. Please refer to FIG. 2 to FIG. 6. FIG. 5 is a block diagram of a control circuit of a quick charge battery according to still another embodiment of the disclosure. FIG. 6 is a block diagram of a control circuit of a quick charge battery according to yet still another embodiment of the disclosure. As shown in FIG. 5, the control circuit 155 has a charging circuit 1551 and a protection circuit 1552. The charging circuit 1551 is electrically connected to the quick charge connector 152 and the protection circuit 1552, and the protection circuit 1552 is electrically connected to the positive terminal 111, the negative terminal 112 and the electrically conductive member 132. Specifically, the quick charge connector 152 is adapted to be get external electricity through an electric wire plugged thereto, and the external electricity can be used to charge the battery cell 11 through the charging circuit 1551 and the protection circuit 1552. The charging circuit 1551 is configured to transform the external electricity to charge the battery cell 11. The protection circuit 1552 is configured to prevent damage due to overcharge voltage, and prevent the current of the external electricity from transmitting to the electrically conductive member 132. While the battery cell 11 is discharging, the protection circuit 1552 is able to prevent current of the battery cell 11 from transmitting to the charging circuit 1551 and the quick charge connector 152. It is noted that the protection circuit 1552 is also electrically connected to the electrically conductive member 132 and the battery cell 11 so that the current generated by the battery cell 11 can be transmitted through the electrically conductive member 132.

While the quick charge battery 1 is charging through the conventional charging seat, the protection circuit 1552 allows the quick charge battery 1 and the conventional charging seat to be electrically conducted through the electrically conductive member 132. However, how and when the protection circuit 1552 triggers the connection between the electrically conductive member 132 and the battery cell 11 is not restricted. For example, the protection circuit 1552 may trigger the connection between the electrically conductive member 132 and the battery cell 11 as it receives a particular value of voltage. In another example, the protection circuit 1552 may be switched its state when receiving a signal from a mechanical switch or an optical switch.

For example, when the battery cell 11 is a 18500 battery to make the quick charge battery 1 become a 18650 battery, the control circuit 155 is able to be disposed as shown in FIG. 5 because the output voltage of the 18500 battery is equal to the 18650 battery, but the present disclosure is not limited thereto. For another example, when the output voltage of the quick charge battery 1 is different from the output voltage of the battery cell 11, the control circuit 155 requires to further include a voltage adjusting module 1553 as shown in FIG. 6. The voltage adjusting module 1553 is electrically connected to the protection circuit 1552 and the electrically conductive member 132 and is configured to adjust the output voltage of the quick charge battery 1.

In one embodiment, the quick charge connector 152 is, for example, a type-C port or other types of connectors that can provide a function of quick charge. The quick charge connector 152 is exposed from the opening 134 of the sleeve part 1312 and the opening 171 of the insulating film 17. In the case the quick charge connector 152 is the type-C port, since the type-C port is able to output a current of at least larger than 600 mA, the quick charge battery 1 has the function of quick charge. Thus, through the type-C port, it only takes approximately half to one hour to fully charge the battery cell 11. In contrast, the output current of the charging seat is about 320 mA, so it takes approximately 4 to 5 hours to fully charge the battery cell 11, which takes much longer to charge than the type-C port.

Figure 7:
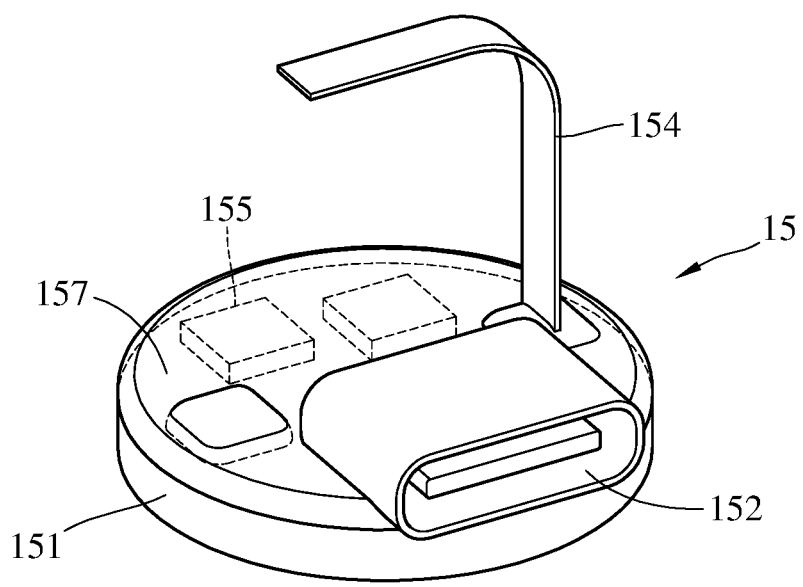
FIG. 7 is an exploded view of a quick charge battery according to a further another embodiment of the disclosure.

Please refer to FIG. 7, FIG. 7 is an exploded view of a quick charge battery according to a further another embodiment of the disclosure. In this embodiment and other embodiments, there is a thermally conductive material 157 coated on a surface of the circuit board 151. The thermally conductive material 157 helps to dissipate heat generated by the quick charge connector 152 so as to improve the charging efficiency of the quick charge battery 1. The thermally conductive material 157 is, for example, a 3M™ 8810 which is a thermally conductive adhesive transfer tape. The thermally conductive material adopts pressure sensing adhesive and a thermally conductive ceramic filling material, such that a plurality of plates are able to be jointed through pressure instead of thermally solidification, so as to achieve well joint and heat interface. The thermally conductive material tap equips with a polyester silicone pad, such that it is convenient for further processing and cutting. The thermally conductive material tape provides a well adhesion, a favorable thermal conductivity, and an electrical insulation.

Figure 8:
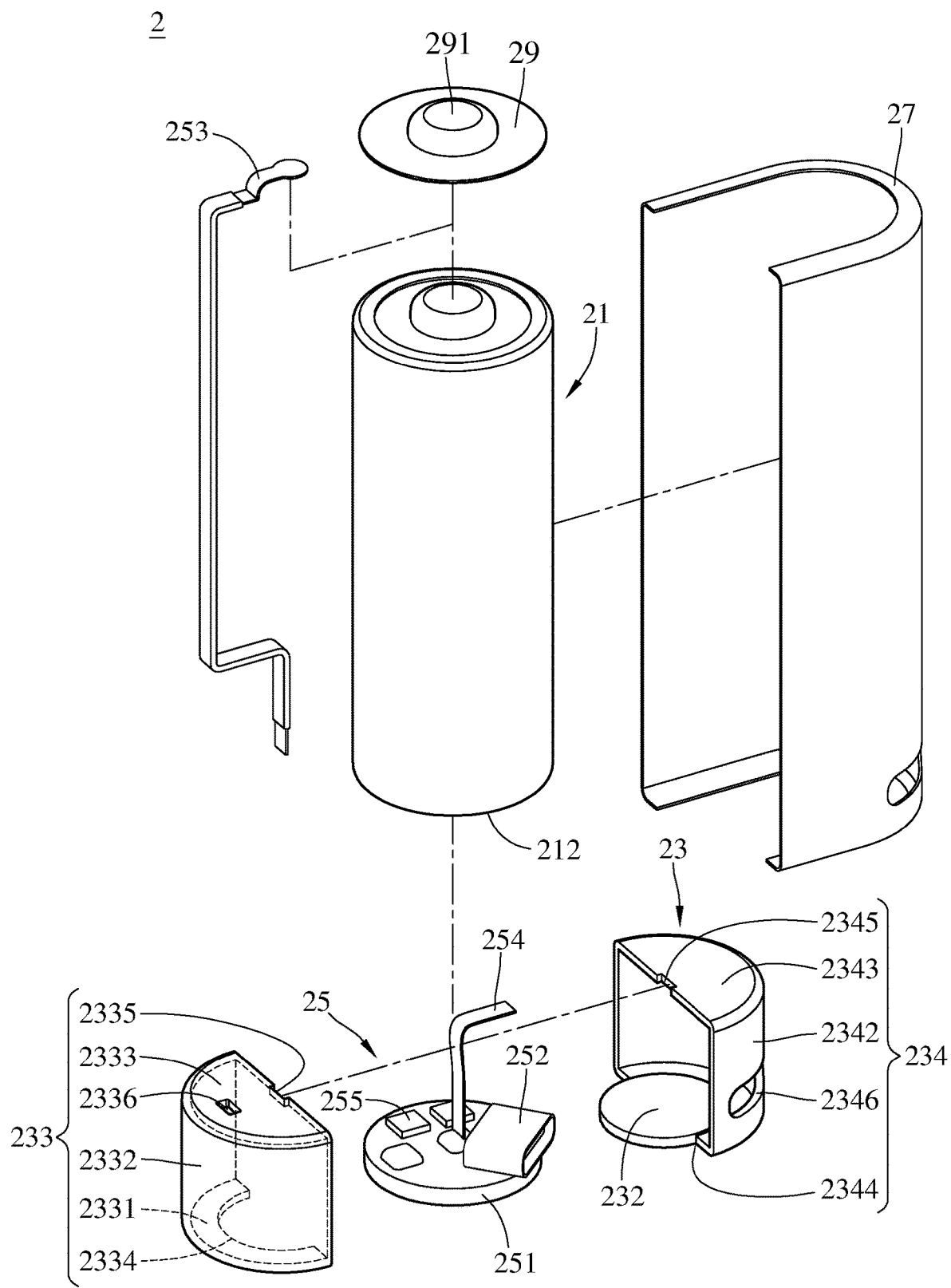
FIG. 8 is an exploded view of a quick charge battery according to still a further another embodiment of the disclosure.
Figure 9:
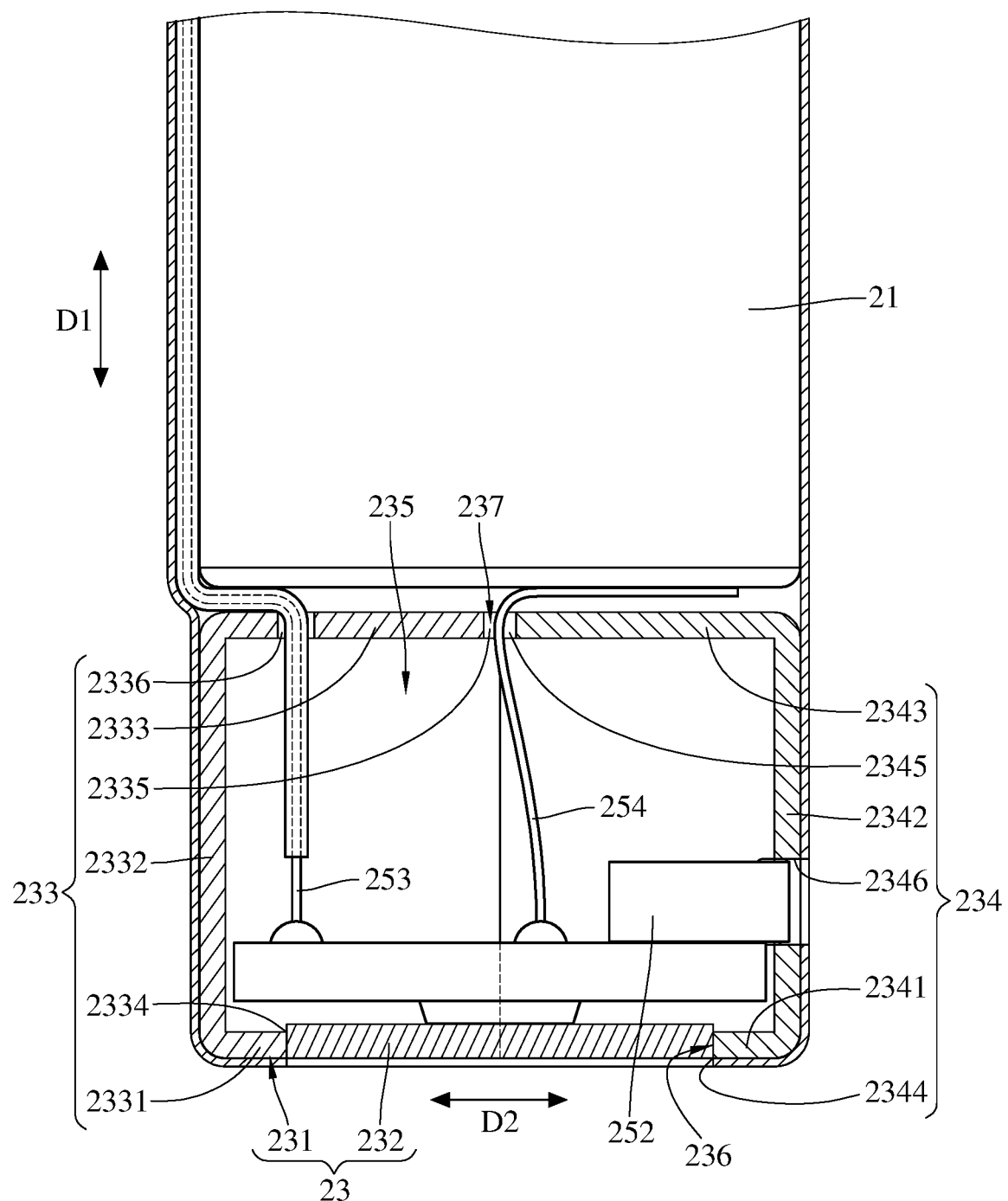
FIG. 9 is a cross-sectional view of the quick charge battery in FIG. 8.

Please refer to FIG. 8 and FIG. 9. FIG. 8 is an exploded view of a quick charge battery according to still a further another embodiment of the disclosure. FIG. 9 is a cross-sectional view of the quick charge battery in FIG. 8. As shown in figures, this embodiment provides a quick charge battery 2. The quick charge battery 2 includes a battery cell 21, a cap assembly 23, a quick charge assembly 25 and an insulating film 27. The battery cell 21, the quick charge assembly 25 and the insulating film 27 are similar to that in the previous embodiments, so it is not repeated hereinafter.

In this embodiment, the cap assembly 23 has a main body 231 and an electrically conductive member 232. The main body 231 includes a first piece 233 and a second piece 234. The first piece 233 includes a first bottom part 2331, a curved part 2332, a second bottom part 2333, a first cut 2334, a second cut 2335 and a through hole 2336. The first bottom part 2331 is connected to an edge of the curved part 2332 away from the battery cell 21. The second bottom part 2333 is connected to another edge of the curved part 2342 close to the battery cell 21; that is, the second bottom part 2333 and the first bottom part 2331 are respectively connected to the two opposite sides of the curved part 2332. The first cut 2334 penetrates through the first bottom part 2331, and is located on an edge of the first bottom part 2331 away from the curved part 2332. In this embodiment, the first cut 2334 is a semi-circular cut in the same curvature as the curved part 2342, but the present disclosure is not limited thereto. In some other embodiments, the first cut 2334 may be in other shapes. The shape of the second cut 2335 is in rectangular. The second cut 2335 penetrates through the second bottom part 2333, and is located on an edge of the second bottom part 2333 away from the curved part 2342. The shape of the through hole 2336 is in rectangular. The through hole 2336 penetrates through the second bottom part 2333. In addition, the shapes of the second cut 2335 and the through hole 2336 of this embodiment are in rectangular, but the present disclosure is not limited thereto.

The second piece 234 includes a first bottom part 2341, a curved part 2342, a second bottom part 2343, a first cut 2344, a second cut 2345 and an opening 2346. The first bottom part 2341 is connected to an edge of the curved part 2342 far away from the battery cell 21. The second bottom part 2343 is connected to another edge of the curved part 2342 close to the battery cell 21; that is, the second bottom part 2343 and the first bottom part 2341 are respectively located on two opposite sides of the curved part 2342. The first cut 2344 penetrates through the first bottom part 2341, and is located on an edge of the first bottom part 2341 far away from the curved part 2342. In this embodiment, the first cut 2344 is a semi-circular cut in the same curvature as the curved part 2342, but the present disclosure is not limit thereto. In some other embodiments, the first cut 2344 may be in other shapes. The shape of the second cut 2345 is in rectangular. The second cut 2345 penetrates through the second bottom part 2343, and is located on the second bottom part 2343 far away from an edge of the curved part 2342. The opening 2346 penetrates the curved part 2342 so as to expose the quick charge connector 252 from the cap assembly 23, so that the shape of the quick charge connector 252 is design for corresponding to the shape of the opening 2346. In some other embodiments, the opening 2346 may be disposed on the curved part 2342 of the first piece 233.

The first piece 233 and the second piece 234 are able to be assembled together. There is an accommodating space 235 surrounded and formed by the first piece 233 and the second piece 234. The accommodating space 235 is configured to accommodate the quick charge assembly 25. In addition, there is an opening 236 formed by the first cut 2334 of the first piece 233 and the first cut 2344 of the second piece 234, and the opening 236 is connected the accommodating space 235 so as to expose the components in the accommodating space 235. In this embodiment, the electrically conductive member 232 is exposed from the opening 236. In detail, the electrically conductive member 232 is aligned with the first cut 2334 and the first cut 2344. In some other embodiments, the electrically conductive member 232 may be located much closer to the battery cell 21 than the first bottom part 2331 and the first bottom part 2341, and it still can be exposed from the opening 236.

In addition, there is an opening 237 formed by the second cut 2335 of the second bottom part 2333 and the second cut 2345 of the second bottom part 2343. The opening 237 is also connected to the accommodating space 235 and allows the first electrically conductive element 253 or the second electrically conductive element 254 to dispose therethrough. Similarly, the opening 2346 also allows the first electrically conductive element 253 or the second electrically conductive element 254 to dispose therethrough. In one example, the first electrically conductive element 253 and the second electrically conductive element 254 are respectively disposed through the through hole 2336 and the opening 237, and this configuration helps to maintain the first electrically conductive element 253 and the second electrically conductive element 254 to be spaced apart by a proper distance so as to prevent the magnetic field from producing, but the present disclosure is not limited thereto. In some other embodiments, there may be no second cut 2335 or second cut 2345, such that the second electrically conductive element 254 protrudes from the cap assembly 23 through the second cut 2335 or the second cut 2345.

Similarly, the cap assembly 23 protrudes from a negative terminal 212 of the battery cell 21 in the axial direction D1 so as to lengthen the overall length. In such as case, the length of the quick charge battery 2 is the length of the battery cell 21 plus the thickness of the cap assembly 23 in the axial direction D1. The quick charge assembly 25 is located in the cap assembly 23 and closer to battery cell 21 than the electrically conductive member 232 so as to provide the quick charge connector 252 to be connected to the external power for charging the battery cell 21. The insulating film 27 extends in the axial direction D1 and is sleeved on the exterior of battery cell 21 and the cap assembly 23, such that two surfaces of the battery cell 21 and the cap assembly 23 respectively perpendicular the axial direction D1 are exposed from the insulating film 27.

With the descriptions of the connection manner between the circuit board 251 and the battery cell 21, the application of the insulating film 27, the electrical connection manner between the electrically conductive member 232 and the battery cell 21, the application of the control circuit 255 and so on that are thoroughly described in the aforementioned embodiments, one skilled in the art would able to know how to modify or adjust the battery cell 21, the cap assembly 23, the quick charge assembly 25 and the insulating film 27, so it is not repeated hereinafter.

In this embodiment, the second bottom part 2333 and the second bottom part 2343 can be taken as an electrical insulation member as the electrical insulation gasket 133 in FIG. 4 for preventing a short circuit between the battery cell 11 and the quick charge assembly 15. In addition, the present disclosure is not limited to the main body 231 which is consisted of the first piece 233 and the second piece 234. In some other embodiments, the main body may be an inseparable single piece, which also a sleeve part, a first bottom part and a second bottom part but integrated into a single piece.

Figure 10:
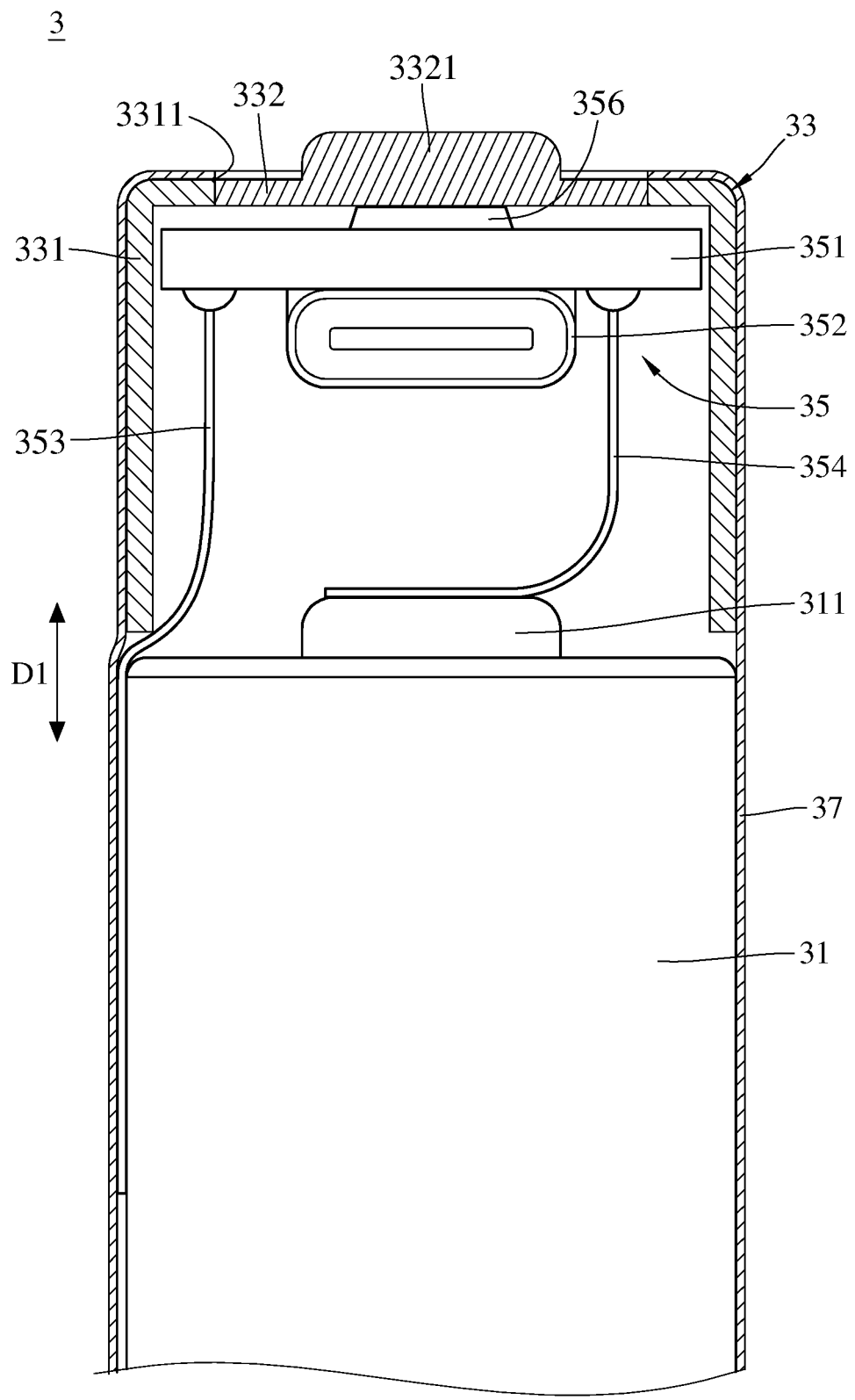
FIG. 10 is a cross-sectional view of a quick charge battery according to still yet a further another embodiment of the disclosure.

In the aforementioned embodiments, the cap assembly is disposed on the negative terminal of the battery cell. The following paragraphs would describe one embodiment that the cap assembly is disposed on the positive terminal of the battery cell. Please refer to FIG. 10. FIG. 10 is a cross-sectional view of the quick charge battery according to still yet a further another embodiment of the disclosure. As shown in FIG. 10, this embodiment provides a quick charge battery 3. The quick charge battery 3 includes a battery cell 31, a cap assembly 33, a quick charge assembly 35 and an insulating film 37. The cap assembly 33 protrudes from the positive terminal 311 in the axial direction D1 so as to lengthen the overall length. In such as case, the length of the quick charge battery 3 is the length of the battery cell 31 plus the thickness of the cap assembly 33.

The cap assembly 33 is not restricted to the type in FIG. 1 to FIG. 3 or FIG. 8 to FIG. 9. The difference is that the electrically conductive member 332 further has a cap part 3321 when the cap assembly 33 is disposed on the positive terminal 311. In detail, in this embodiment, the electrically conductive member 332 is disposed at and aligned with an opening 3311 of the main body 331, the opening 3311 exposes the electrically conductive member 332, and the cap part 3321 protrudes through the main body 331 through the opening 3311. In another embodiment, the electrically conductive member 332 may be located in the main body 331 and away from the opening 3311, and it still can be exposed from the opening 3311. The insulating film 37 extends in the axial direction D1, when it is and is sleeved on the exterior of the battery cell 31 and the cap assembly 33, the negative terminal of the battery cell 31 and the electrically conductive member 332 is exposed from the insulating film 37. In addition, the quick charge connector 352 is exposed from the main body 331 and the insulating film 37 through a hole on the main body 331 and a position of the insulating film 37 corresponding to the hole.

The detail application of the quick charge assembly 35 in FIG. 10 are similar to that in the previous embodiments, so it is not repeated hereinafter. In this embodiment, the circuit board 351 is stacked on the bottom of the main body 331, and a contact 356 is disposed on a surface of the circuit board 351 far away from the battery cell 31. The contact 356 is configured to be electrically connected to the electrically conductive member 332, such that the electrically conductive member 332 is electrically connected to the battery cell 31 through circuit board 351. In some other embodiments, the contact 356 is optional, and the conductive member 332 and the battery cell 31 may be electrically connected to each other via other manners.

According to the quick charge battery as discussed above, the cap assembly is able to be disposed at one any end of the battery cell so as to provide a quick charge connector for the battery cell. That is, the quick charge battery has its own quick charge connector, so it can be charged not only by connecting to external power supply but also by the charging seat. Thus, users can still charge their battery when forget to carry the charging seat with them.

In addition, the cap assembly extends in the axial direction of the battery cell when it is installed on the battery cell. Thus, the cap assembly is able to lengthen the overall length of the quick charge battery so that the quick charge battery can be taken as another type of battery, thereby beneficial for the manufacturing.

Moreover, the quick charge battery can be applied for cylinder-shaped, rectangle-shaped or other shaped battery cell.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A quick charge battery, comprising:
    a battery cell having a positive terminal and a negative terminal;
    a cap assembly located on the positive terminal or the negative terminal and protruding from the battery cell in an axial direction of the battery cell, the cap assembly comprising a main body and an electrically conductive member, and the electrically conductive member located on a side of the main body away from the battery cell;
    a quick charge assembly located in the main body of the cap assembly and located between the battery cell and the electrically conductive member, the quick charge assembly comprising a circuit board and a quick charge connector, the quick charge connector electrically connected to the battery cell through the circuit board and configured to transmit large current, and the electrically conductive member electrically connected to the battery cell through the circuit board;
    an insulating film extending in the axial direction of the battery cell and sleeved on the battery cell and the cap assembly, and the quick charge connector exposed from the main body and the insulating film; and
    a first electrically conductive element electrically connected to the circuit board and the positive terminal of the battery cell, wherein the first electrically conductive element further comprises an electrically conductive portion and an electrical insulation portion, and the electrical insulation portion is located between the battery cell and the electrically conductive portion;
    wherein the main body comprises a first bottom part and a sleeve part, the first bottom part is connected to a side of the sleeve part away from the battery cell, and the sleeve part is located between the quick charge connector and the insulating film at the top or bottom of the insulating film.

2. The quick charge battery according to the claim 1, wherein the quick charge assembly further comprises a second electrically conductive element, wherein the second electrically conductive element is electrically connected to the circuit board and the negative terminal of the battery cell.

3. The quick charge battery according to the claim 2, wherein the quick charge battery further comprises a cover, the cover has a cap part, the cap assembly located on the negative terminal of the battery cell, the cover is located on the positive terminal of the battery cell and protrudes from the battery cell in the axial direction of the battery cell, the insulating film is further sleeved on the cover, and the cap part of the cover is exposed from and protrudes through the insulating film.

4. The quick charge battery according to the claim 2, wherein the first bottom has a first opening, and the electrically conductive member is exposed from the first opening of the first bottom part.

5. The quick charge battery according to the claim 4, wherein the cap assembly further comprises an electrical insulation gasket, and the electrical insulation gasket is located in the main body and is located between the battery cell and the circuit board.

6. The quick charge battery according to the claim 4, wherein the main body further comprises a second bottom part, the second bottom part is connected to a side of the sleeve part close to the battery cell, the second bottom part has at least one second opening, and one of the first electrically conductive element and the second electrically conductive element is exposed from the at least one second opening of the second bottom part.

7. The quick charge battery according to the claim 4, wherein the main body comprises a first piece and a second piece, the first piece and the second piece are assembled to each other so as to form an accommodating space therebetween, and the quick charge assembly is located in the accommodating space.

8. The quick charge battery according to the claim 1, wherein the battery cell is a 18500 battery, or a 18470 battery, and the quick charge battery and a 18650 battery are substantially similar in shape.

9. The quick charge battery according to the claim 1, wherein the quick charge connector is a type-C port or other connectors which have a function of quick charge.

10. The quick charge battery according to the claim 9, wherein the quick charge battery further comprises a thermally conductive material coated on the circuit board, and the quick charge connector is configured to transmit a current of at least larger than 600 mA.

* * * * *